United States Patent Office 3,049,538
Patented Aug. 14, 1962

3,049,538
PROCESS FOR THE STABILIZATION OF STARCH ETHERS
Robert A. Brobst, Harbor Beach, Mich., assignor to Hercules Powder Company, Wilmington, Del., a corporation of Delaware
No Drawing. Filed Mar. 21, 1960, Ser. No. 16,193
9 Claims. (Cl. 260—233.3)

The present invention relates to starch ethers of improved resistance to becoming discolored especially at elevated temperature and to a process of preparing same.

Although, as will be shown and described hereinafter more fully, the present invention is applicable to starch ethers, for the sake of clarity and simplicity the invention will be described herein for the most part with reference to hydroxypropyl starch. As a matter of brevity hydroxypropyl starch is sometimes referred to herein as HPS, hydroxyethyl starch as HES, carboxymethyl hydroxypropyl starch as CMHPS, and diethylaminoethyl hydroxypropyl starch as DEAE-HPS.

"Discoloring" or equivalent terminology is used herein to means changing from substantially colorless to colored as well as changing to a darker shade of color. "MS" is used herein to mean the moles of etherifying agent (e.g., alkylene oxide) substituted per anhydroglucose unit of the starch molecule and is determined by the familiar Zeisel-Morgan method.

There are large and wide-spread uses of the starch ethers of this invention. These include adhesive films for envelopes, laundry starches, paper additives and latex paints. In these applications it is either highly desirable or necessary that the starch ethers employed be heat stable because they are either necessarily or preferably subjected to elevated temperature when initially used or later. For instance, it is often desirable to heat adhesive films to make them easier to apply. Of course, laundry starches are subjected to elevated temperature when clothes containing them are ironed. Paper additives may be subjected to elevated temperature during processing of the paper or later. Latex paints may be subjected to elevated temperature during application or later, e.g., ceiling tile is often baked at elevated temperature for short periods after painting with a latex paint, and sometimes latex paints become exposed to high temperature after application as occurs with painted surfaces which have glass between them and the sun. Discoloration is usually more objectionable in articles of the lighter shades such as pastel or white.

An object of the present invention is to eliminate or minimize discoloration of starch ethers. A further object is to eliminate or minimize discoloration of starch ethers especially at elevated temperature. A still further object is to provide starch ethers which are stable against discoloration especially at elevated temperature. These and other objects will be apparent from the description of this invention given hereinafter.

The above and other objects are accomplished according to this invention by carrying out the process which comprises contacting starch with an alkali, etherifying the alkali starch and neutralizing the excess alkali, the neutralization being effected with nitric acid.

The following examples illustrate specific embodiments of the present invention but are not intended to limit the invention to any greater extent than do the claims of this application. Viscosities were measured on a 60% aqueous solution (60% solids) at 25° C. with a standard Brookfield Synchro-Lectric LVF Viscometer at 6 r.p.m. using a No. 4 spindle. In the examples and elsewhere herein parts and percent are by weight unless otherwise indicated.

EXAMPLE 1.—CONTROL MAKING HPS, NEUTRALIZING WITH ACETIC ACID

Wheat starch was suspended in water at a density corresponding to 18.0° Baumé and treated at 25° C. by stirring with a solution of sodium hypochlorite which contained, based on weight of starch, 6% avaialble chlorine and 1.5% free alkali. After treatment of 15 hours, a sample showed a paste viscosity by Scott of 50 seconds per 100 ml. using 150 grams of starch in 280 ml. of water. The starch was then filtered and resuspended to a density corresponding to 21° Baumé.

To 6,900 ml. of this dispersion or slurry containing 3,000 grams of the hypochlorite oxidized wheat starch 120 ml. of 50% sodium hydroxide was added and this mixture agitated for 15 minutes at room temperature. 1,200 ml. propylene oxide was added and the mixture was heated at 70° C. for 90 minutes. The resulting impure HPS is often referred to in the art as "dope." To this dope was added 120 ml. of acetic acid of 99.5% concentration to a pH of 5.5. In order to further reduce the viscosity of the dope 320 ml. of 35% aqueous hydrogen peroxide was immediately added thereto and allowed to react for 15–30 minutes at 40° C.–50° C. The dope was then dried on a 6-inch diameter atmospheric drum drier using 70 p.s.i.g. steam pressure and a drum speed of 7 r.p.m. The dried HPS was in the form of large flakes containing 5% moisture and having an MS of 0.30. The dried flakes of HPS were broken up and two aqueous solutions thereof made by dissolving 60 grams of the flakes in 40 grams of water. One of the aqueous solutions was used as such and the other solution was first cooked 15 minutes in a water bath of 100° C. to cast a film of each 0.0005 inch thick on white paper. This heat treatment is an accelerated test to show up discoloring rapidly and is at least equivalent to the worst conditions which are encountered in use over a long period of time. The color of the films was measured when cast and after standing for various periods of time at room conditions. The color measurements were made with a direct-reading electronic color instrument or meter. Before using, the instrument was calibrated using color discs Nos. 5067 and 5095. The instrument is scaled in relative units of 0–95. The more colorless the film being measured, the higher is the reading on the instrument. Under the conditions of the test of this invention a reading of 45 or higher after 4 days' aging indicates an acceptable product, i.e., one stabilized to an acceptable extent within the scope of this invention. Further details are given in Table 1 hereinafter. A film color of 45 is the point at which the human eye can detect a color change. That is, film colors greater than 45 appear white and transparent and those below 45 show various degrees of yellow.

The instrument is widely used in industry for measuring powders and dusts. When using with powders a reflectance measurement of opaque products is made. The instrument can be used to measure the transmission of light through translucent materials. I have found it to be very satisfactory in measuring film discoloration. Before using, the instrument is calibrated with two discs, and the particular two discs selected being those which most closely match the darkest color film to be tested and the lightest color film to be tested. The darkest color disc is black disc No. 5000 which has a relative scale of 0 and the lightest color disc is white disc No. 5095 which has a relative scale of 95. Thus the last two numbers of the disc calibration number indicate its approximate reflectance. When the instrument is calibrated to read 0 on No. 5000 disc and 95 on No. 5095 disc the other discs will be spaced along the meter scale between the 0 and 95 readings according to the relative order indicated by the last two digits of their catalog number. For instance, disc No. 5067 and 5079 would read 67 and 79, respectively, on the meter.

EXAMPLES 2 AND 3.—THIS INVENTION MAKING HPS, NEUTRALIZING WITH NITRIC ACID

These examples were carried out in substantially the same way as Example 1 except nitric acid instead of acetic acid was used as the neutralizing agent. The main difference in the conditions of these two experiments was the viscosity of the uncooked film. Further details are given in Table 1 hereinafter.

Table 1

EXAMPLES 1-3

| Example | Neutralizing Acid | Uncooked film | | Color Readings, Days | | | | | |
|---|---|---|---|---|---|---|---|---|---|
| | | | | 0 | | 4 | | 30 | |
| | | pH | Viscosity, cps. | U[1] | C[2] | U | C | U | C |
| 1 | Acetic | 5.4 | 17,000 | 47 | 35 | 45 | 32 | 44 | 32 |
| 2 | Nitric | 5.2 | 45,000 | 50 | 50 | 49 | 48 | 51 | 46 |
| 3 | ...do... | 5.0 | 15,000 | 54 | 48 | 56 | 50 | 51 | 46 |

[1] U is uncooked.
[2] C is cooked.

The above examples show how one may obtain substantial benefits by practicing specific embodiments of the present invention. Many variations may be made in these embodiments within the scope of this invention and still realize the benefits thereof.

The preferred starch ethers which may be stabilized according to this invention include hydroxyalkyl starch ethers, e.g. hydroxyethyl starch and hydroxypropyl starch; carboxyalkyl hydroxyalkyl starch ethers, e.g. carboxymethyl hydroxypropyl starch; dialkylaminoalkyl hydroxyalkyl starch ethers, e.g. diethylaminoethyl hydroxyethyl starch and diethylaminoethyl hydroxypropyl starch.

The process of making the hydroxyalkyl and the carboxyalkyl hydroxyalkyl starch ethers is conventional, other than the neutarlization step, and here the starch ether reaction product is neutralized with the nitric acid of this invention instead of with such acids as acetic acid conventionally used. The conditions of making these starch ethers and how these conditions may be varied are well known in the art and need no discussion here. One preferred way of making the dialkylaminoalkyl hydroxyalkyl starch ethers is by hydroxyalkylating an aqueous alkaline slurry of starch and aminoalkylating the hydroxyalkyl starch, the temperature of the etherifications being about 60° C.–75° C. After the aminoalkylation the reaction mixture is neutralized with nitric acid.

Generally, the amount of nitric acid used will be such as to give a reaction mixture of pH 3-7, prefreably pH 5-6. The particular pH will depend somewhat on the starch ether being prepared, the use to be made of the starch ether and the degree of stabilization desired. Of course, the purification is related to the amount of neutralization acid used, and this is well known in the art.

The viscosity and MS of the starch ether being stabilized in accordance with this invention are not important factors. For instance, I detected no significant difference in stability with starch ethers of 6,000 cps. and 35,000 cps. and 0.1–0.5 MS. Viscosity and MS are determined largely by the fields in which the products are to be used, and these properties may vary considerably outside the ranges listed above.

This invention is applicable to starch ethers prepared from cereal starches either with or without destroying the starch grain. Likewise, the invention is applicable to starch ethers prepared with or without reduction in the viscosity thereof. Viscosity reducing agents in general may be used; these are well known in the art and include, e.g., hypohalites and acids.

As mentioned in the fourth paragraph of this application, the stabilized products of this invention are useful, e.g., for films, laundry starches, paper additives and latex paints. For films and laundry starches aqueous solutions of the starch ethers are normally used; whereas for paper additives, latex paints and also for textile uses usually the starch ethers are used in the form of a dope prepared by mixing water with a dry powder of the starch ethers.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. In the process of making starch ethers wherein starch is contacted with an alkali, the alkali starch is etherified and the excess alkali is neutralized, the improvement which comprises employing nitric acid as the neutralizing agent whereby a product of substantially increased stability to discoloration is obtained.

2. The process of claim 1 wherein the starch ether is a hydroxyalkyl starch ether.

3. The process of claim 1 wherein the starch ether is hydroxypropyl starch.

4. The process of claim 1 wherein the starch ether is hydroxyethyl starch.

5. The process of claim 1 wherein the starch ether is a carboxyalkyl hydroxyalkyl starch ether.

6. The process of claim 1 wherein the starch ether is carboxymethyl hydroxypropyl starch.

7. The process of claim 1 wherein the starch ether is a dialkylaminoalkyl hydroxyalkyl starch ether.

8. The process of claim 1 wherein the starch ether is diethylaminoethyl hydroxyethyl starch.

9. The process of claim 1 wherein the starch ether is diethylaminoethyl hydroxypropyl starch.

References Cited in the file of this patent

UNITED STATES PATENTS

| | | |
|---|---|---|
| 2,469,957 | Fenn | May 10, 1949 |
| 2,744,894 | Benedict et al. | May 8, 1956 |
| 2,813,093 | Caldwell et al. | Nov. 12, 1957 |
| 2,853,484 | Lolkema et al. | Sept. 23, 1958 |